Patented Sept. 6, 1932

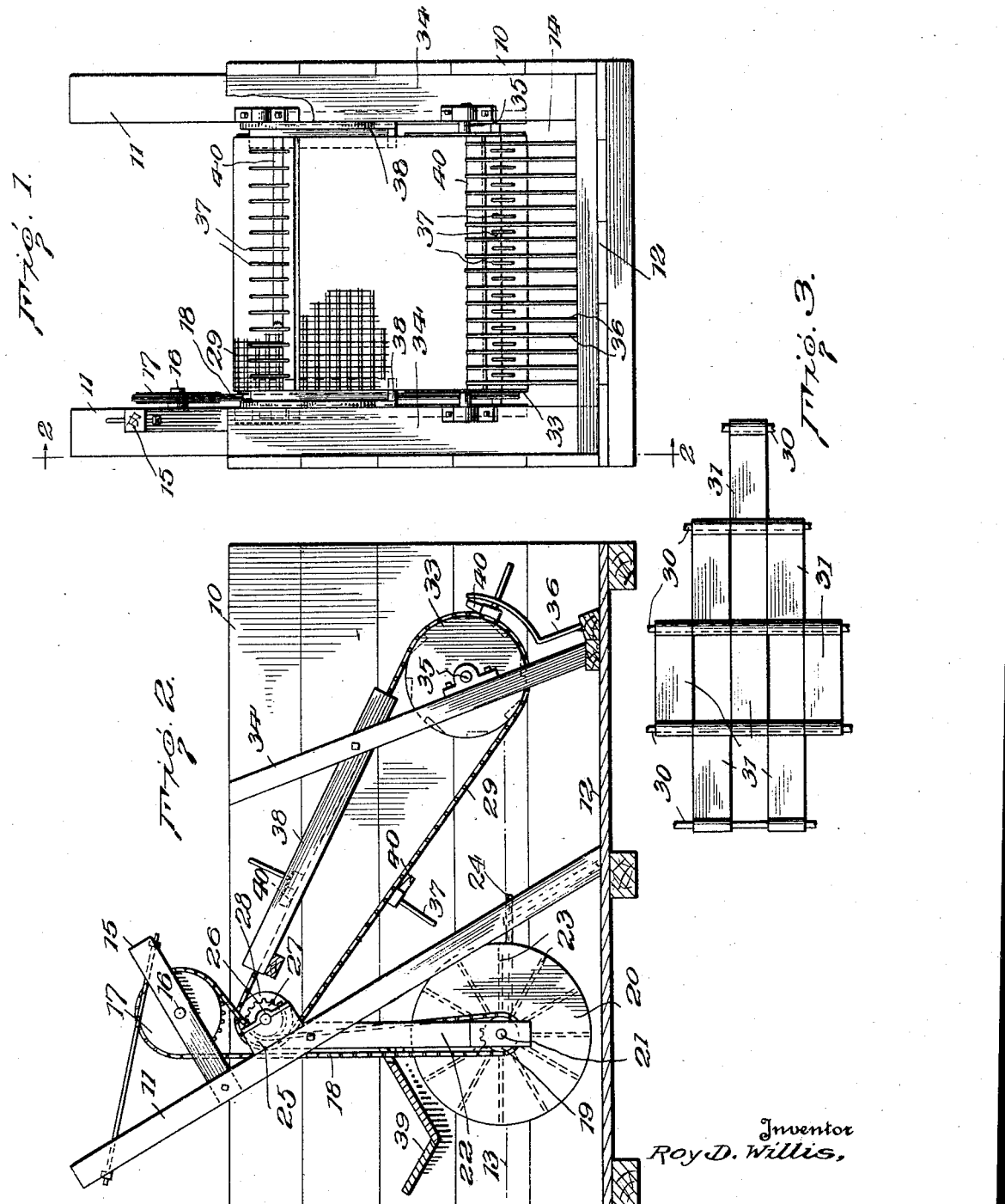

1,875,790

UNITED STATES PATENT OFFICE

ROY D. WILLIS, OF BIGPINE, CALIFORNIA

FISH SCREEN

Application filed January 22, 1930. Serial No. 422,597.

This invention relates to means for preventing the movement of fishes to or from irrigation ditches, headers, feeder streams and the like. In practically all irrigation projects the irrigation ditches or flumes are fed from rivers and feeder streams which contain various kinds of fish and it is not desirable to have fish enter the irrigation ditches. In order to meet this condition, various form of screen guards have been provided which check the movement of fish and the present invention is principally concerned with a device of this nature.

Objects of the invention are: to provide an improved fish screen having power means for cleaning the adjacent water of trash and other débris; to provide an improved fish guard for irrigation ditches and the like having means for passing trash and other débris thereover under power received from a water drop formed in the guard itself; to provide in a combined fish guard and trash cleaner, a novel water wheel mechanism for operating trash clearing means; and generally to provide a novel and improved structural arrangement of elements forming a fish screen and trash cleaning mechanism adapted for installation in irrigation ditches and the like.

In the drawing:

Figure 1 is an end elevation, taken from the right of Figure 2, of an irrigation ditch or flume equipped with a screen constructed in accordance with the principles of the invention.

Figure 2 is a side elevation of the mechanism as shown in Figure 1.

Figure 3 is a fragmentary plan view of a portion of the trash conveyor means.

The mechanism is shown as mounted in a conventional water box 10 which lines an irrigation ditch to provide a flume for the passage of water therethrough. Within the box 10 is mounted a framework including upright side bars 11 which are inclined in the direction of water flow within the flume and which have their bottom ends resting on the bottom 12 of the water box. The water level as indicated by the line 13 in Figure 2 is maintained at a predetermined height by the provision of a water drop board 14 disposed transversely of the water box 10 between the side bars 11 of the framework and which rests against the flume bottom 12.

The side bars 11 project above the top of the water box, one of the bars being provided with a forwardly extending bracket 15 carrying a stub shaft 16 on which is journaled an idler sprocket wheel 17 over which is disposed a sprocket drive chain 18 having connection with a sprocket wheel 19 carried by a water wheel 20 journaled on a shaft 21 extending between depending hanger arms 22, one only of which is shown in Figure 2, these hanger arms being connected at their upper ends to the main frame side bars 11. In this disposition of the parts as shown in Figure 2, it will be noted that the water wheel 20 having the paddles 23 is located directly in rear of the drop plate 14 so that the water wheel acts as an under-shot power wheel. Between the main frame 11 and the hanger arms 22 means are provided, which in this instance comprises a draw bolt 24, for adjusting the relative position which the water wheel bears to the water drop plate 14. Under proper manipulation of the draw bolt 24, the water wheel may be moved laterally toward or away from the drop in the direction of water flow within the flume.

One of the main frame side bars 11 is provided adjacent its upper portion with a supporting block 25 forming a bearing for the shaft 26 of a drive sprocket wheel 27 which is engaged by the sprocket chain 18 extending between the water wheel 20 and the idler 17. This drive sprocket wheel 27 imparts power to a sprocket drum 28 carried on the shaft 26 and which has disposed thereover an endless conveyor 29 of the open link type as best shown in Figure 3. This conveyor is made up of side sprocket chains between which are extended transverse rods 30 carrying alternately arranged spaced links 31, which links are hingedly connected over the rods 30 and form the body of the conveyor imparting the necessary flexibility thereto for the proper movement of the conveyor over the drum 28 and over a forward drum 33 mounted in a second frame 34 disposed in the flume box 10 in spaced relation forwardly of the main frame bars 11 and carrying the shaft 35 of the drum 33.

This forward drum 33 is of open work construction, being rotated by means of the sprocket chains forming the sides of the conveyor belt 29, and it is mounted sufficiently above the bottom of the water box so that there is ample clearance beneath the bottom of the drum. The bottom of the drum extends below the water level line 13 and the drum operates directly in rear of a grizzly 36 which is of conventional construction. At suitable intervals on the conveyor belt 29 rake teeth 37 are provided, which teeth pass between the upright bars of the grizzly 36 in the operation of the apparatus. Along the upper portion of the conveyor belt guide bars 38 are mounted in the framework and these guides 38 cooperate with the rake teeth 37 to prevent the dropping off of trash which is being carried up on the conveyor belt.

In assembling the mechanism for service operation the respective framework elements are mounted between the side walls of the water box 10 being rearwardly inclined in the direction of water flow which is assumed to be from the right of Figure 2. The provision of the drop plate 14 which is of solid construction enables a damming up of water in the bottom of the flume until it reaches a predetermined height from which point it spills over onto the paddles 23 of the water wheel 20 whereupon the necessary power is imparted to the water wheel to drive the conveyor 29 through the medium of the sprocket chain drives hereinbefore described. In operation the conveyor belt 29 is caused to travel so that the respective rake teeth 37 are carried upwardly from the bottom of the water box through the grizzly bars 36, at which point they function as pickers to engage and elevate any trash and débris which may have collected on the bottom of the flume, as well as elevating all floating trash within the ditch. This trash is carried up and rearwardly by the conveyor belt being deposited over the top of the rear drum 28 from which point it falls onto a discharge trough 39 located in rear of the water wheel 20. In order to provide against an accumulation of trash in the trough 39, the teeth 37 carry scoops 40 in the form of open front receptacles which pick up sufficient water to maintain a constant sluicing of the trough 39. These scoops preferably extend the entire width of the conveyor as shown in Figure 1. They have upwardly and outwardly inclined bottom portions, shown in Figure 2, which combined with the normal inclination of the upper reach of the conveyor prevent loss of any appreciable amount of water while being lifted.

It is apparent therefore that with a guard as described installed within a water box, the water level within the box may be set for maintenance at a predetermined height and the apparatus is particularly efficacious for employment in flumes wherein there is a relatively slow movement of the water. The drop plate 14 acting as a spill-way insures the necessary power for the paddles of the water wheel and at the same time this construction does not permit of any rapid passage of water through the water box. Accordingly, movement of the parts of the mechanism is gradual and under such a movement the collecting and clearing of trash from the flume bed is efficiently carried out, the conveyor acting to elevate the trash and pass the same over the guard discharging it rearwardly thereof into the trough provided for that purpose. No fish can pass the drop plate 14 and the movement of the conveyor belt is so gradual that it is not possible for the fish to be carried up on the body of the belt.

This specification and the accompanying drawing describe and illustrate a preferred embodiment of the invention, but it is to be understood that the disclosure does not constitute a limitation upon the scope of the invention. Any desired changes and modifications may be made in the structural details as will fall within the scope of the invention as claimed.

I claim:

1. In a fish guard for flumes, the combination with a conveyor for lifting débris from the water, of a débris receiving trough positioned to receive the débris lifted from the said conveyor, and means carried by the said conveyor for lifting water and discharging the same into the trough to flush the débris from the receiving trough.

2. A fish guard comprising a grizzly and a water wheel disposed in a stream, a conveyor for lifting débris from the stream cooperating with the grizzly, means to drive said conveyor by the water wheel, a débris receiving trough above the stream and below the discharge end of said conveyor, and means for lifting water from the stream and discharging the same into the trough, carried by the conveyor.

3. In a fish screen the combination with a flume; a dam therein; a water-wheel adjacent the down stream side of the said dam; an idler located above the said water-wheel; an endless chain extending between the said water-wheel and the said idler; a sloping endless conveyor; and a driving-sprocket for the said conveyor, meshing into a reach of the said chain between the said water-wheel and the said idler; whereby the said conveyor is moved in a direction reversed to that of the said water-wheel, by which it is indirectly driven.

4. A fish guard comprising a flume, uprights therein inclined in the direction of the water flow, a correspondingly inclined dam plate mounted between the uprights at the bottom thereof, hanger arms pivotally suspended from the uprights at a point past the dam plate on the down stream side, a water wheel rotatably mounted between said arms at the down stream side of the plate and positioned to be operable by the fall of the overflow, a connection between the hanger arms and uprights to hold the wheel in fixed position, means for manually adjusting the same to compensate for the varying velocity of the water flowing over the dam plate against the wheel, and an inclined conveyor driven by said wheel.

In testimony whereof I affix my signature.

ROY D. WILLIS.